& nbsp;

3,520,729
BATTERIES HAVING A POSITIVE SILVER-OXIDE ELECTRODE
Ernst Voss, Niederhofheim, and Peter Ness, Kelkheim, Taunus, Germany, assignors to Varta Aktiengesellschaft, Frankfurt am Main, Germany
Filed July 2, 1968, Ser. No. 741,986
Claims priority, application Germany, July 14, 1967, V 34,066
Int. Cl. H01m 35/02
U.S. Cl. 136—20      8 Claims

ABSTRACT OF THE DISCLOSURE

A battery having a positive electrode containing silver-oxide and an oxidic manganese compound of MnO(OH) and $MnO_2$.

BACKGROUND OF THE INVENTION

The present invention relates generally to batteries having a positive silver-oxide electrode, and, more specifically, to batteries having a positive electrode comprising a silver-oxide compound and an oxidic manganese compound. Batteries containing a positive silver-oxide electrode and a negative zinc electrode or a positive silver-oxide electrode and a negative cadium electrode are desirable because of their high energy densities. These batteries while useful because of their high energy densities have the disadvantage of not being able to provide continuous constant discharge voltage because the silver-oxide electrode often discharges at two potentials corresponding to the steps of $Ag \rightleftharpoons Ag^+ + e^-$ and $Ag^+ \rightleftharpoons Ag^{++} + e^-$.

One method known for stabilizing the discharge potential of such electrodes comprises heating the silver-oxide electrode in a fluid of gas media at a temperature of approximately 95° C. for several hours. This partially stabilized the discharge voltage but the disadvantage of this method is that it produces a substantial loss in battery capacity because practically all of the silver (I) oxide ($Ag_2O$) is reduced to silver (II) oxide (AgO) without utilizing the energy created by this reaction.

Another method of stabilizing the discharge potential of the silver-oxide electrodes comprises immersing the silver-oxide electrode in an aqueous solution of silver nitrate and then drying the electrode. This method is quite expensive and has not proven entirely effective.

These methods are only effective if the electrodes are discharged only once such as in a primary cell. If the electrodes are discharged and recharged such as in a secondary cell the voltage stabilizing effects are lost after the first discharge of the secondary cell.

This invention overcomes the disadvantages of the known stabilizing method in batteries having a positive silver-oxide electrode and also keeps the discharge voltage over discharge cycles at a potential of the step $Ag \rightleftharpoons Ag^+ e^-$ without losing the capacity inherent in the step $Ag^+ \rightleftharpoons Ag^{++} + e$.

SUMMARY OF THE INVENTION

Briefly, the invention comprises discovering that a battery having a positive silver-oxide electrode containing an oxidic manganese compound stabilizes the discharge voltage while also retaining the electrode capacity when the electrode is discharged and charged.

DESCRIPTION

After initial tests, it became apparent that of the oxidic manganese compounds, hydrated gamma-manganic oxide ($\gamma$-MnO(OH)) and gamma manganese dioxide ($\gamma$-$MnO_2$) produced favorable results. The oxidation-reduction potential of MnO(OH)/$MnO_2$ is $+191$ millivolts measured against the normal hydrogen electrode. The potentials of the silver electrode are as follows: $Ag_2O$/AgO at 570 millivolts and Ag/$Ag_2O$ at 344 millivolts (measured against the normal hydrogen electrode).

To determine the optimum proportion of oxidic manganese compounds in the electrodes a number of electrodes were manufactured. Each electrode was 19 millimeters in diameter and had a total weight of two grams. The electrode contained a mixture of silver (I) oxide $Ag_2O$ and hydrated gamma-manganic oxide ($\gamma$-MnO(OH))

which varied in weight from 0 to 100% of the electrode weight.

The electrodes were subjected to cyclic discharging and charging operation with over-sized Cd/Cd (OH)$_2$ counter electrodes. An electrolyte of 6 normal KOH was used in the battery. Charging and discharging were performed by means of a constant current device at 87 milliamps which corresponds to 10 hours of current at a theoretical capacity of 840 milliamp hours based on the original weight of the electrodes, or about 6 hours current with respect to the actual observed average current output or about 500 milliamp hours in cyclic operation of these electrodes. The larger actual output was due to sedimentation and insufficient utilization. The charge factor of 1.4 limited the charging time and the discharging was limited at .8 volt by the voltage.

The addition of hydrated gamma-manganic oxide ($\gamma$-MnO(OH)) in amount from 5% by weight to 45% of electrode weight produced good results. Most favorable results were obtained by adding 20% by weight to 40% by weight, preferably, however, 30% by weight provided the best results.

Figure 1:
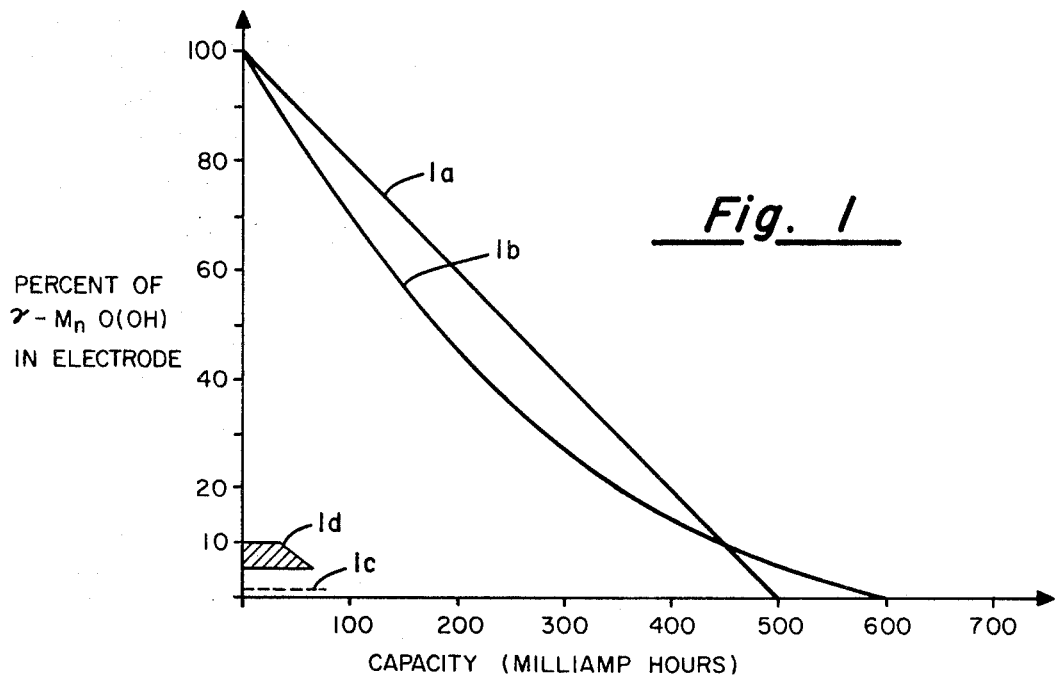
FIG. 1 shows the capacity of the positive silver-electrode as a function of the percent by weight of hydrated gamma-manganic oxide ($\gamma$-MnO(OH)) in the electrode after five cycles of discharging and charging the electrode.

FIG. 1, line 1a shows the theoretical capacity output curve in milliamp hours as a function of the percent of hydrated gamma-manganic oxide ($\gamma$-MnO(OH)) in the electrode after 5 cycles of discharging and charging. Curve 1b shows the actual output capacity of the electrode. Line 1c indicates the capacity of the pure silver-oxide electrode at the potential of the bivalent silver. The shaded area 1d indicates the output capacity with an additive of hydrated gamma-manganic oxide ($\gamma$-MnO(OH)) between 5% by weight and 10% by electrode weight produces a potential discharge step. The duration of this step corresponds to about 65 milliamp hours with an addition of 5% by weight and decreases with an additive of 10% to about 25 milliamp hours. When the additive is further increased discharging occurs substantially at the potential of the silver (I) oxide ($Ag_2O$) until the fifth cycle.

Figure 2:
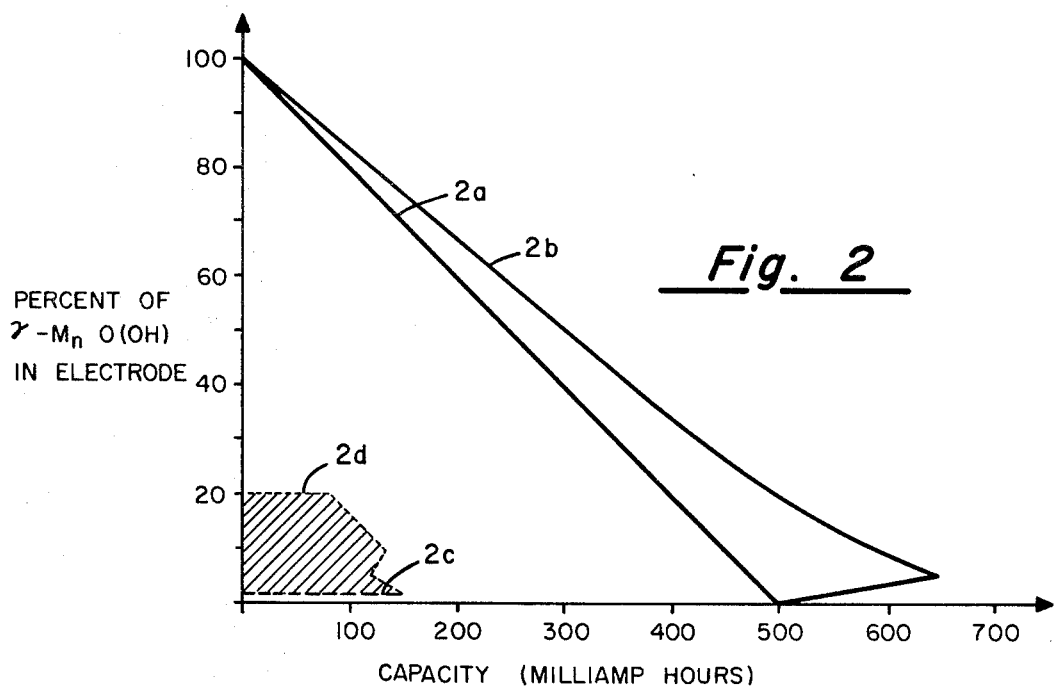
FIG. 2 shows the capacity of the positive silver-oxide electrode as a function of the percent by weight of the hydrated gamma-manganic oxide ($\gamma$-MnO(OH)) in the electrode after 25 cycles of discharging and charging the electrode.

Referring to FIG. 2, line 2a shows the theoretical output capacity of the electrode in milliamp hours as a function of the percentage of hydrated gamma-manganic oxide ($\gamma$-MnO(OH)) in an electrode after 25 cycles of discharging and charging the electrode. Curve 2b shows the actual output capacity of the electrode. The curves shown in FIG. 2 are already stabilized after the tenth cycle. Curve 2c shows the electrodes capacity output without any additive discharges at a value of 150 milliamp hours at the potential of the bivalent silver. Increasing the amount of hydrated gamma-manganic oxide ($\gamma$-MnO(OH)) in the electrode decreases the capacity of the electrode that is discharged at the potential of the bivalent silver along the line 2d. When the electrode contains approximately 20% of hydrated gamma-manganic oxide less than 100 milliamp hours are discharged at the potential of the bivalent silver. The bivalent discharging continues to diminish until with an addition of 40% of hydrated gamma-manganic oxide in the electrode the secondary potential is entirely eliminated.

Note, the additional output capacity which occurred after addition to about 5% by weight of the hydrated gamma-manganic oxide ($\gamma$-MnO(OH). This is probably based upon improved conductivity.

The preferred quantities of the hydrated gamma-manganic oxide have already been mentioned but one wishing to make selection between capacity and stabilizing effect can do so by referring to FIGS. 1 and 2.

Figure 3:
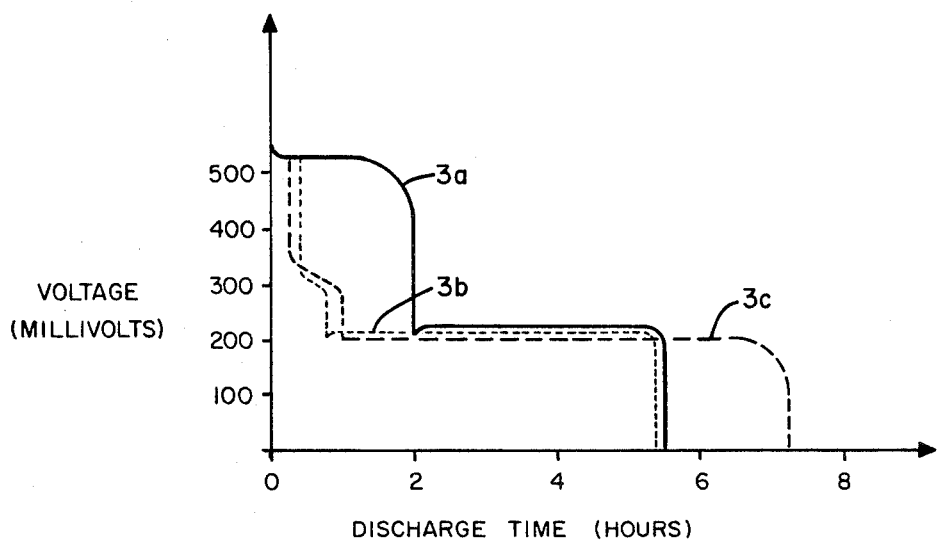
FIG. 3 shows the discharge curves for positive electrodes having varying compositions of silver-oxide and hydrated gamma-manganic oxide.

FIG. 3 shows the discharge time of the electrodes containing some additives and no additives after approximately ten cycles. Curve 3a shows the discharge voltage (measured against a Hg/HgO reference electrode) of a silver oxide electrode without an additive. Curve 3b shows the discharge voltage of an electrode comprising 10% by weight of hydrated gamma-manganic oxide ($\gamma$-MnO(OH)). Curve 3c shows discharge voltage of an electrode comprising 20% by weight of ($\gamma$-MnO(OH)).

A comparison of the current output of an electrode of silver-oxide without an additive and an electrode of silver-oxide containing hydrated gamma-manganic oxide ($\gamma$-MnO(OH)) content improves the capacity of the electrode from an average of 420 milliamp hours to an average of 537 milliamp hours for the charge factor 1.28. The voltage of the silver (I) oxide discharge step is nevertheless approximately 20 millivolts lower as shown in FIG. 3. Part of the total discharge capacity contains the potential step of silver (II) oxide which remains below 3% at 5 to 10 hours discharge current.

Curve 3c shows that with an addition of approximately 20% by weight of hydrated gamma-manganic oxide is used, there is practically no bivalent discharge step and the voltage remains fairly constant.

When the voltage during discharge is also considered besides the current output, i.e., comparing the energy outputs including the potential measured against the Hg/HgO reference electrode the output of the electrode containing hydrated gamma-manganic oxide ($\gamma$-MnO(OH)) is about equivalent to an electrode containing no additive. The presence of the hydrated gamma-manganic oxide ($\gamma$-MnO(OH)) in the silver-oxide electrode has a stabilizing effect on the discharge step of the silver (I) oxide. This stabilizing effect is probably caused by the specific value of the $MnO(OH)/MnO_2$ reduction-oxidation potential step being lower than that of the $Ag_2O/AgO$ reduction-oxidation potential step.

Figure 4:
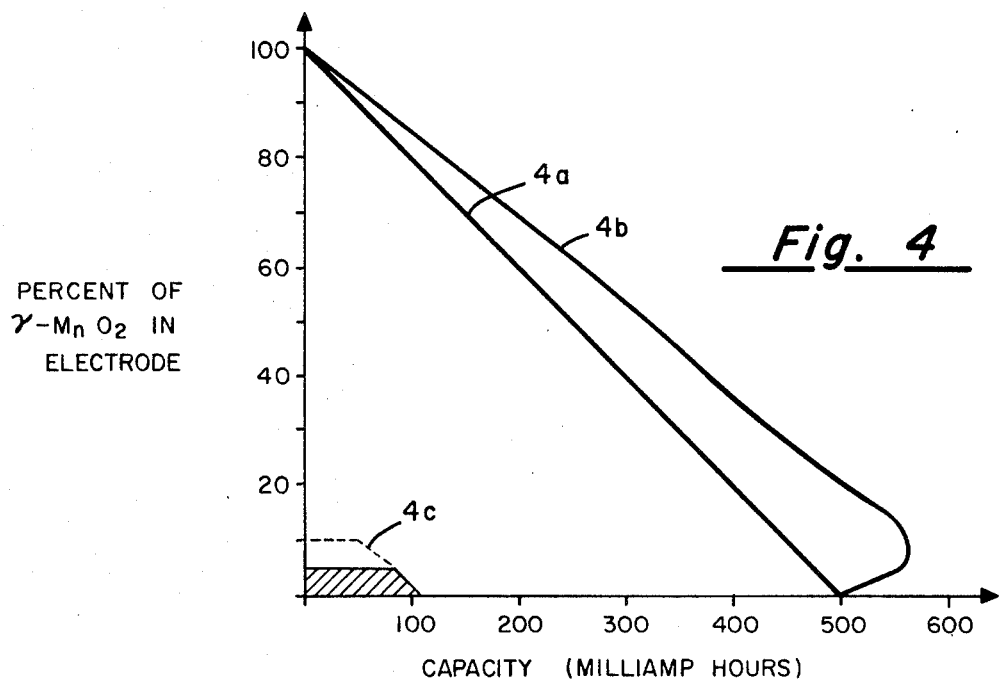
FIG. 4 shows the capacity of the positive silver-oxide electrode as a function of the percent by weight of gamma-manganese dioxide ($\gamma$-$MnO_2$) in the electrode after five cycles of discharging and charging the electrode.
Figure 5:
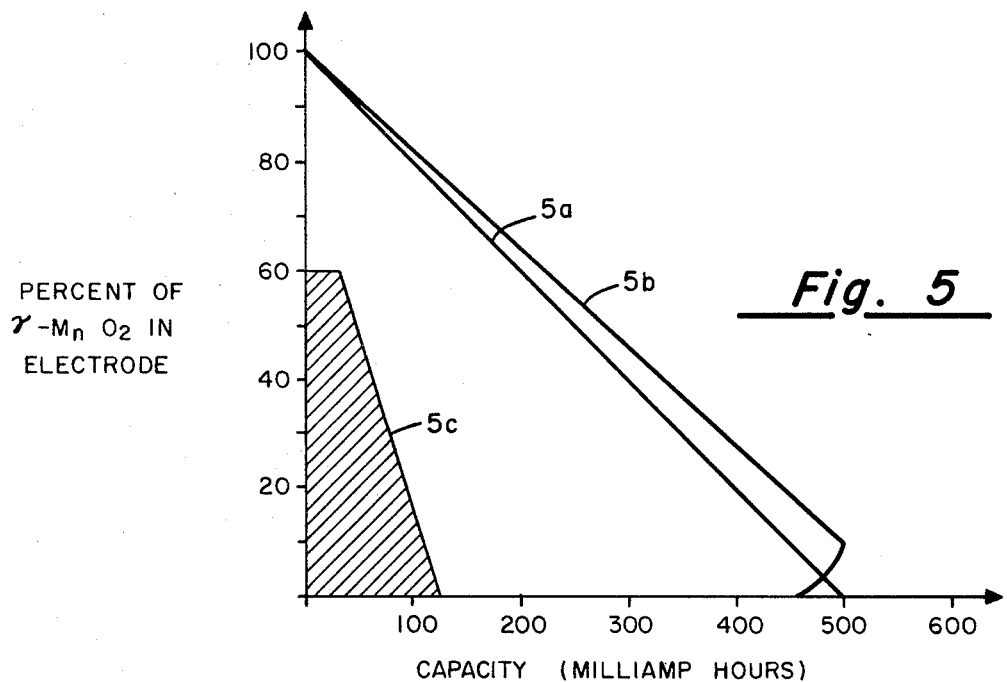
FIG. 5 shows the capacity of the positive silver-oxide electrode battery as a function of the percent by weight of the gamma-manganese dioxide ($\gamma$-$MnO_2$) in the electrode after 20 cycles of discharging and charging the electrode.

Similar effects were obtained by the addition of gamma-manganese dioxide ($\gamma$-$MnO_2$) to the silver-oxide electrode. Electrodes with varying additive of gamma-manganese dioxide ($\gamma$-$MnO_2$) were also tested under the same condition as described previously. FIG. 4 and 5 show the capacity of the silver-oxide electrode containing gamma-manganese dioxide. Referring to FIG. 4, curve 4a shows the theoretical capacity of the electrode in milliamp hours as a function of the percentage of gamma manganese dioxide ($\gamma$-$MnO_2$) in the electrode after five cycles of discharging and charging. Curve 4b shows the actual output of the electrode in milliamp hours. Line 4c indicates an area where the discharging occurs at the higher oxidation step which ranges from 0 to 5% by weight of gamma-manganese dioxide ($\gamma$-$MnO_2$). Gamma manganese dioxide ($\gamma$-$MnO_2$) has increased the capacity output of the electrode as is shown in FIG. 4. Tests revealed that an addition of 10% by weight to 20% by weight of gamma-manganese dioxide ($\gamma$-$MnO_2$) 10%.

Referring to FIG. 5, curve 5a shows the theoretical capacity output curve in milliamp hours as a function of the percentage of gamma-manganese dioxide ($\gamma$-$MnO_2$) in the electrode after 20 cycles of discharging and charging. Curve 5b shows the actual measured capacity output. This curve stabilized after approximately 10 cycles.

A shaded area 5c indicates that the discharging at the potential of the bivalent silver decreases steadily as the proportion of gamma-manganese dioxide ($\gamma$-$MnO_2$) increases from 0% until at approximately 80% by weight of gamma-manganese dioxide ($\gamma$-$MnO_2$) there is no bivalent discharge step at all, even after 20 cycles.

Therefore, an additive of gamma-manganese dioxide ($\gamma$-$MnO_2$) does not result in a substantial improvement of the discharge behavior but nevertheless, the capacity-output increases with certain amounts of additive.

By using silver-oxide electrodes containing an additive of hydrated gamma-manganic oxide ($\gamma$-MnO(OH)) it is possible to diminish the discharge step of the bivalent silver. Even though an extended diminishing of the discharge step of the bivalent silver results in a decrease of the utilization of the capacity of the electrodes, it does produce a more constant discharge voltage.

By using silver-oxide electrodes containing an additive of the gamma-manganese dioxide ($\gamma$-$MnO_2$) produces an improvement in the capacity output of the electrode.

We claim:

1. A battery having a positive silver-oxide electrode and a negative electrode, wherein the silver-oxide electrode comprises an additive selected from the group consisting of $\gamma$-Mno(OH) and $\gamma$-$MnO_2$.

2. A battery according to claim 1 wherein the silver-oxide electrode comprises an addition of $\gamma$-MnO(OH).

3. A battery according to claim 2 wherein the silver-oxide electrode comprises between 5% by weight and 45% by weight of $\gamma$-MnO(OH).

4. A battery according to claim 1 wherein the silver-oxide electrode comprises between 20% by weight and 40% by weight of $\gamma$-MnO(OH).

5. A battery according to claim 1 wherein the silver-oxide electrode comprises $\gamma$-$MnO_2$.

6. A battery according to claim 5 wherein the silver-oxide electrode comprises between 10% by weight and 20% by weight of $\gamma$-$MnO_2$.

7. A battery according to claim 1 wherein the negative electrode comprises zinc.

8. A battery according to claim 1 wherein the negative electrode comprises cadmium.

(References on following page)

References Cited

UNITED STATES PATENTS

| | | | |
|---|---|---|---|
| 2,723,301 | 11/1955 | West et al. | 136—107 |
| 2,816,153 | 12/1957 | Kort | 136—107 |
| 3,033,909 | 5/1962 | Urry | 136—120 |
| 3,332,802 | 7/1967 | Clune et al. | 136—107 |
| 3,414,440 | 12/1968 | Moore | 136—107 |

WINSTON A. DOUGLAS, Primary Examiner

C. W. LEFEVOUR, Assistant Examiner

U.S. Cl. X.R.

136—24, 30, 102